United States Patent [19]
Tjernstrom

[11] 3,929,010
[45] Dec. 30, 1975

[54] METHOD AND MEANS FOR MEASURING THE CLAMPING FORCE ON TRANSFORMER WINDINGS

[75] Inventor: Ove Tjernstrom, Ludvika, Sweden
[73] Assignee: Allmanna Svenska Elektriska Aktiebolaget, Vasteras, Sweden
[22] Filed: Sept. 30, 1974
[21] Appl. No.: 511,302

[30] Foreign Application Priority Data
Oct. 26, 1973 Sweden............................ 73145427

[52] U.S. Cl. .................................................. 73/141 R
[51] Int. Cl.² ................................................ G01L 5/00
[58] Field of Search .................. 73/141 R, 40, 46, 47

[56] References Cited
UNITED STATES PATENTS
| | | | |
|---|---|---|---|
| 1,371,484 | 3/1921 | Howard | 73/40 |
| 2,328,289 | 8/1943 | Morgan et al. | 73/47 |
| 3,178,937 | 4/1965 | Bradley | 73/141 R |

Primary Examiner—Herbert Goldstein
Assistant Examiner—Anthony V. Ciarlante

[57] ABSTRACT

For measuring the clamping force prevailing in the windings of a transformer which has windings mechanically clamped between clacks arranged in two clack rings which support the windings at their ends, clacks are provided forming columns of clacks in the windings over which the clamping force is to be measured. One of the clacks arranged in the clack rings is in contact with one of the outer clacks of each of the columns. One of the clacks in the clack ring is provided with a channel which opens into the area of contact between it and the column clack and to the outside. Liquid under pressure is supplied to this passage, and, when there is balance between the added pressure medium and the pressure medium leaking out in the area, the pressure is determined and a clamping force is derived from the measured pressure with the help of a calibration curve.

2 Claims, 2 Drawing Figures

METHOD AND MEANS FOR MEASURING THE CLAMPING FORCE ON TRANSFORMER WINDINGS

BACKGROUND OF THE INVENTION

1. Field of the Invention

The invention relates to a method and means for measuring the clamping force on transformer windings.

2. The Prior Art

In the manufacture of transformers it is of interest to be able to determine the force by which the windings are clamped in the axial direction after they have been placed around the respective core leg and the upper yoke has been interleaved. Too high a pressure may successively lead to settlings within the core and too low a pressure means that the winding may become quite unloaded in axial direction. As it should be possible to perform the measuring also when the transformer is under tension, measuring devices which are influenced by electric or magnetic fields are unsuitable and in some cases quite excluded from use.

SUMMARY OF THE INVENTION

The present invention relates to a method and a means for determining in a rapid and simple manner the clamping force which prevails in the windings of a transformer, where the windings are clamped between blocks or clacks in clack-rings which are arranged as supports for the windings at their two ends. The invention is characterised in that a pressure medium, preferably transformer oil, is pressed from a pressure medium source through a channel in either of the clacks in at least one of said clack-rings into an area between said clack and a clack in contact with it in the clack column in the winding, over which the clamping force is to be measured, that a pressure medium pressure is determined at which there is a balance between added pressure medium and pressure medium leaking out in said area and that the prevailing clamping force is derived from the measured pressure with the help of a calibration curve.

BRIEF DESCRIPTION OF THE DRAWINGS

In the accompanying drawing.

DESCRIPTION OF THE PREFERRED EMBODIMENTS

Figure 1:
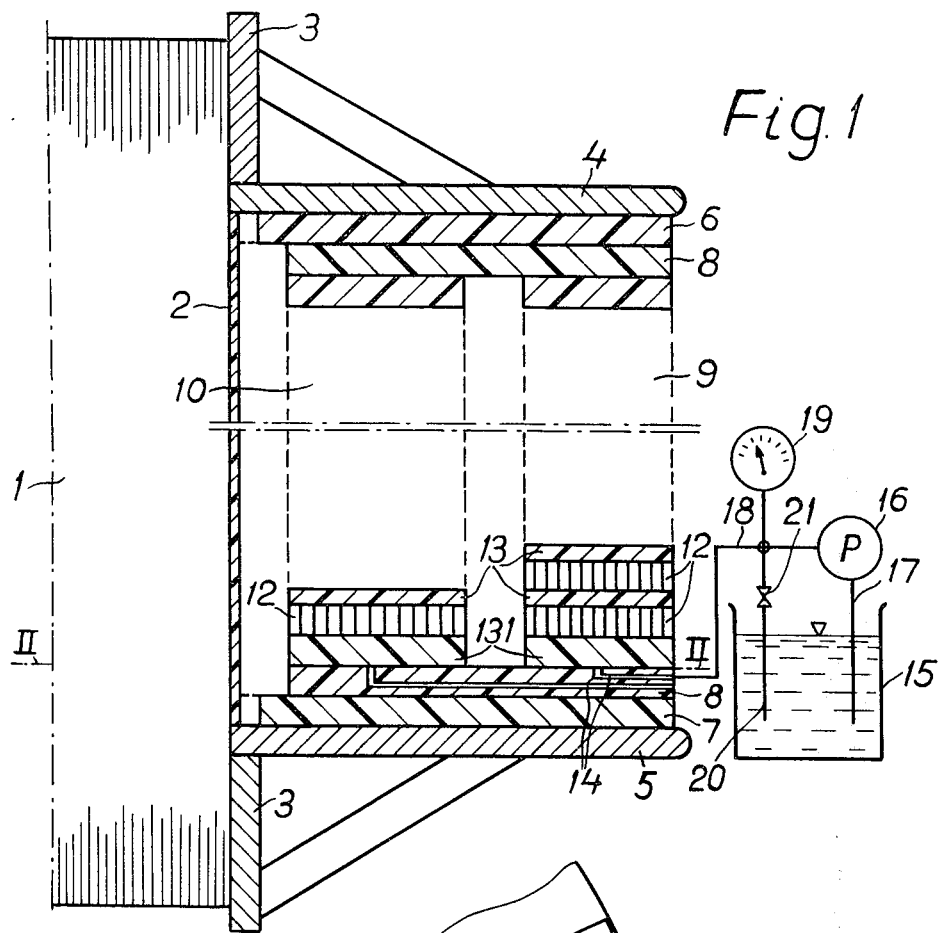
FIG. 1 shows a vertical section through the windings of a transformer.
Figure 2:
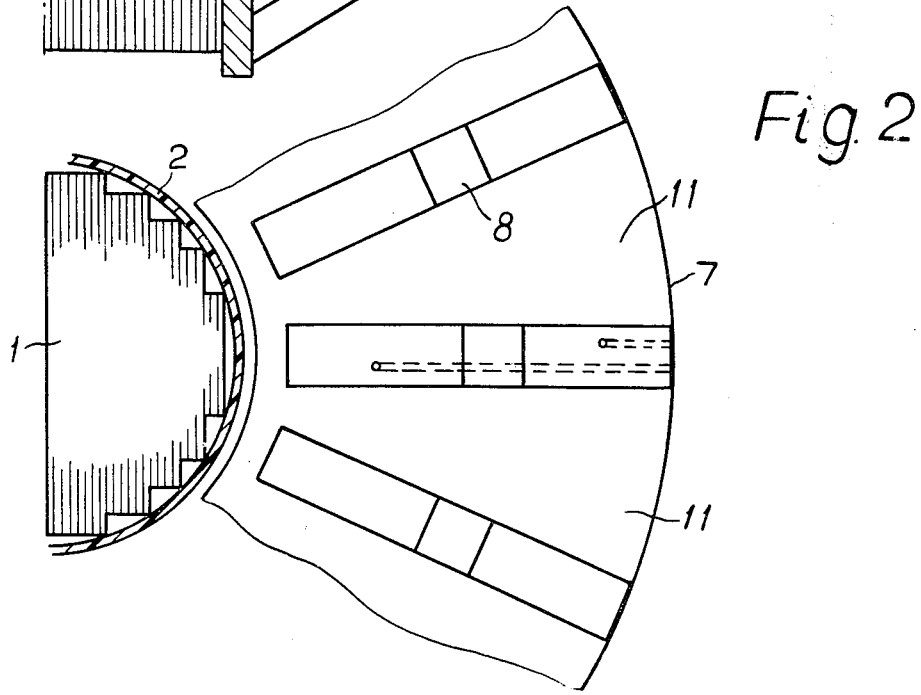
FIG. 2 shows a horizontal section along the line II—II of FIG. 1.

In the figures, 1 designates a section through the core leg as well as the upper and lower yokes. An insulating cylinder 2 surrounds the core leg. Press flanges 3 are arranged one on either side of the yokes to hold them together and act as supports for the upper and lower winding supports 4 and 5, respectively. Clack-rings 6 and 7, respectively, common for all the windings, make contact with each winding support. On the sides of the clack-rings facing the winding, the clack-rings are provided with a number of radially arranged clacks 8 which suitably extend from the outer edge of the outer winding 9 to the inner edge of the inner winding 10. Between the clacks 8 there are formed horizontal trapezoidal oil channels 11.

The windings may be built up in a conventional manner and according to FIG. 1 they consist of a number of horizontal discs 12, each one consisting of a number of conductor turns, which may be series- or parallel-connected, or they may consist of a number of parallel conductor parts, each one forming a number of turns. Between each disc a number of clacks 13 are inserted at the same peripheral distance from each other as the clacks 8 on the clack-rings. The clacks 13 are arranged vertically on top of each other so as to form columns of clacks between a clack-ring clack 8 on the lower clack-ring 7 and a clack-ring clack 8 on the upper clack-ring 6. All this is well known and is only mentioned to give a background of the invention.

According to the invention at least one of the clacks 8 on at least one of the clack rings 6 and 7 is provided with a channel 14, which has one end facing the radially outwardly facing end of the clak 8, whereas the other end of the channel opens out into the surface of the clack which faces towards the winding, where said clack makes contact with the lower and upper clack, respectively, of a column of clacks in the winding. FIG. 1 shows how the invention is applied at the lower end of the winding, where the lowermost clack in the clack columns of the windings is designated 131. The figure also shows that there are two channels 14 in the clack-ring clack 8, both channels opening out into the area between the clack 8 and the clack 131, respectively.

A pressure medium source placed outside the transformer comprises a vessel 15 preferably containing transformer oil. A pump 16 sucks oil from the vessel through a tube 17 and presses the oil through a tube 18 into the channel 14 in the clack 8. A manometer 19 shows the oil pressure on the pressure side of the pump, that is, the pressure prevailing in the oil in the area between the clacks 8 and 131. The pressure side of the pump can be connected to the vessel 15 by means of a tube 20 and a valve 21.

When the pump 16 starts, the pressure in the tube 18 rises, and accordingly also the fluid pressure in the space between the clacks 8 and 131 where the passage 14 opens out. Against the fluid pressure there is the counter pressure exerted by the clamping force of the winding on the clack 131. When the fluid pressure approaches the counter-acting pressure from the clamping force, the oil pumped in starts leaking out between the two clacks, and when the two pressures are equal to each other a balance occurs between them so that the leakage between the clacks is the same as the amount of oil which is pumped in. The manometer pressure prevailing at the time is read and the corresponding clamping pressure is determined from a calibration curve. Such a calibration curve is produced by the fact that two clacks, the areas of which are equal to the contact surface between the clacks 8 and 131, are pressed against each other with a gradually increasing pressure. For each pressure step, where there is a fixed measured value of the press pressure acting on the clacks, the oil pressure is determined which maintains a balance between pumped-in and leaking oil, as appears from the above. Thus, in this curve the pressure on the manometer 19 is the input value and the press pressure on the winding the desired output value.

The figures show that there are channels in the clack 8 for both winding 9 and 10, thus making it possible to measure the press pressure in the two windings independent of each other. Similarly, an arbitrary number of clacks can be provided with channels so that measuring can be performed at several points of the winding.

The tube 18, which suitably consists of a flexible hose, is connected to the channel 14 by pressing a conical nipple attached to the end of the hose into orifice of the channel. For this purpose the orifice of the channel is bored to have the same conicity as the nipple.

As regards the pressure medium source, it can be mentioned that the oil can be taken directly from the transformer tank, thus making the use of a separate oil vessel 15 unnecessary. The valve 21 is to be regarded as an overload valve and can be omitted for certain types of pumps.

I claim:

1. Method for measuring the clamping force prevailing in the windings of a transformer having windings mechanically clamped between first clacks (8) arranged in two clack-rings (6,7) which support the windings at their two ends, second clacks (13) forming columns of clacks in the windings (9,10) over which the clamping force is to be measured, some of the second clacks (131) being in contact with the first clacks, at least one of the contacting clacks (8) having a channel (14) therein opening into the contact surface between the clacks and to the outside, which comprises supplying pressure medium from a pressure medium source (16) through said channel (14) into the area between said clack and a contacting clack, and determining the pressure medium pressure at which there is balance between added pressure medium and the pressure medium leaking out in said area.

2. In a transformer having windings in which the windings are mechanically clamped between two clack rings which support the windings at their two ends, first clacks arranged within the clack rings and second clacks forming columns of clacks in the windings over which the clamping force is to be measured, some of the second clacks being in contact with the first clacks, at least one of the contacting clacks having a channel therein opening into a contact surface area between the clacks and to the outside, means to supply pressure medium to said channel, and means to determine the pressure medium pressure at which there is a balance between added pressure medium and pressure medium leaking from said area.

* * * * *